United States Patent [19]
Arnold et al.

[11] 3,818,571
[45] June 25, 1974

[54] APPARATUS FOR INSERTING WINDING TURNS

[75] Inventors: Richard B. Arnold; Fredrick Koenig, both of Fort Wayne, Ind.

[73] Assignee: General Electric Company, Fort Wayne, Ind.

[22] Filed: Apr. 6, 1973

[21] Appl. No.: 348,757

[52] U.S. Cl. ............................................. 29/205 R
[51] Int. Cl. ............................................. H02k 15/06
[58] Field of Search .......... 29/205 R, 205 D, 203 R, 29/596, 606

[56] References Cited
UNITED STATES PATENTS

| | | | |
|---|---|---|---|
| 3,324,536 | 6/1967 | Hill | 29/606 X |
| 3,389,865 | 6/1968 | Stuckey | 29/205 R X |
| 3,685,118 | 8/1972 | Payne et al. | 29/205 D |
| 3,689,976 | 9/1972 | Donovan | 29/205 D |
| 3,698,063 | 10/1972 | Smith | 29/205 R |

*Primary Examiner*—Thomas H. Eager

[57] ABSTRACT

Coil insertion tool elements have selected longitudinally extending surface portions contoured or curved to at least approximate curvature of bore defining surface of a tooth of laminated magnetic cores into which windings are to be injected. Tool elements include one or two tooth tip protecting or covering lips, and these lips or lip, rather than extending directly from curved surface portions, extend from relieved surface regions. These regions are at the arcuate extremities of longitudinally extending curved surfaces.

10 Claims, 4 Drawing Figures

PATENTED JUN 25 1974　　3,818,571

APPARATUS FOR INSERTING WINDING TURNS

CROSS-REFERENCE TO RELATED APPLICATIONS

Dallas F. Smith application Ser. No. 311,769, filed Dec. 4, 1972 and Richard B. Arnold application Ser. No. 237,829, filed Mar. 24, 1972, are related applications and the entire disclosures of those applications are specifically incorporated herein by reference.

BACKGROUND OF THE INVENTION

This invention relates generally to equipment particularly adapted for use in the manufacture of dynamoelectric machines and, more particularly, to tools useable during the injection or insertion of winding coil turns into slots of a laminated magnetic core.

Coil injection or insertion equipment is widely used in the dynamoelectric machine industry. In the motor industry (and particularly the segment of the industry that makes what are termed "fractional" or "small" horsepower motors), equipment often is used that inserts winding turns axially along a laminated core and into slots of the core. Hill U.S. Pat. No. 3,324,536, issued June 13, 1967; and Dallas F. Smith U.S. Pat. No. 3,698,063, issued Oct. 17, 1972; are examples of this type of equipment and the entire disclosures of these two patents are specifically incorporated herein by reference.

During use of this type of equipment, a magnetic core, e.g., a stator core is placed in alignment with a plurality of "blades" or "fingers" that are disposed in a generally circular array or pattern although large gaps may exist between adjacent blades. Then one or more winding turns, previously placed in selected winding gaps between preselected ones of the blades are subsequently forced along the stator core and into axially extending core slots — often by a device known as a "pusher" or "stripper".

In many pieces of equipment these blades or fingers are formed of longitudinally extending, solid pieces of steel that are contoured or shaped so as to provide smooth surfaces along which winding turn segments may move and slide without damage thereto. The blades or fingers, (referred to hereinafter as "tools") may flex somewhat relative to one another, depending on how they are mounted to a tool support. However, these tools usually are provided with lips that extend from a longitudinally extending planar surface; such lips being designed to embrace the enlarged tips of a core tooth in order to prevent winding damage during the coil insertion process. These tool lips often break or fracture with the result the tool must be replaced. This type of tool failure represents a substantial problem, and it would be desirable to overcome the same.

Accordingly, it is a primary object of the present invention to provide new and improved coil insertion apparatus having new and improved tools.

It is a more specific object of the present invention to provide new and improved tools having a physical configuration, at least along the portions thereof that are to be in close proximity to teeth of a magnetic core, that are less susceptible to damage than heretofore.

SUMMARY OF THE INVENTION

In carrying out the above and other objects in a preferred exemplification, we provide coil insertion tool elements that have at least selected longitudinally extending surface portions thereof contoured or curved to at least approximate the curvature of the bore defining surface of a tooth of laminated magnetic cores into which windings are to be injected. In the illustrated exemplification, the tool elements include two tooth tip protecting or covering lips, and these lips, rather than extending directly from the above mentioned curved surface portions, extend from relieved surface regions that are provided at the arcuate extremities of the longitudinally extending curved surfaces.

The invention itself, is particularly pointed out in the claims appended hereto. However, further objects and advantages of our invention will be better understood by referring to the following description of one preferred embodiment thereof, and referring to the drawing.

DESCRIPTION OF THE ILLUSTRATED EMBODIMENT

Figure 1:
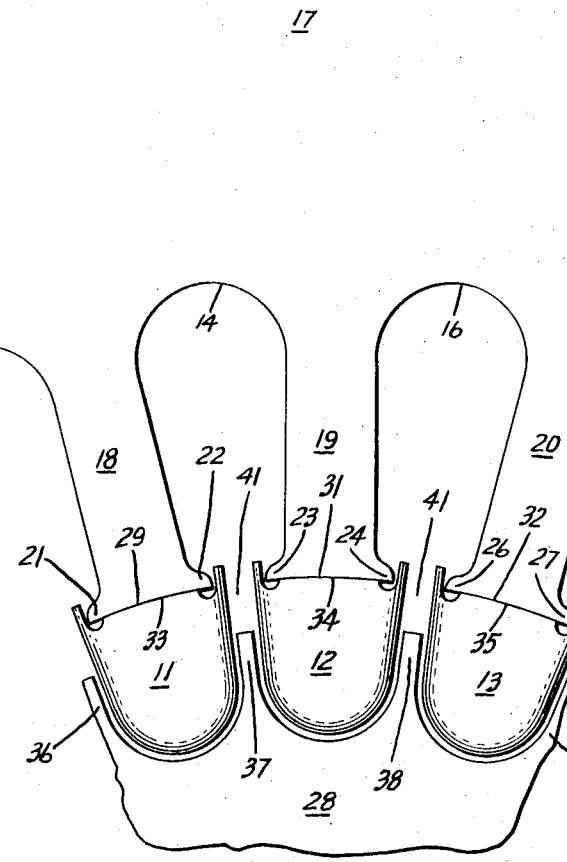
FIG. 1 is a plan view, with substantial parts broken away, of a portion of apparatus embodying the invention and a portion of a stator core into which one or more winding turns are to be injected.

It will be understood from FIG. 1 that new and improved coil injection apparatus includes the tools 11, 12, 13 and as many other tools as are desired for use in placing a winding of any determined configuration and distribution of the slots 14, 16, etc., of the magnetic core 17 which is comprised of a plurality of soft magnetic steel or iron laminations.

The laminations, and thus the core, establish teeth 18, 19, and 20, each of which have enlarged tooth tips as shown at 21, 22, 23, 24, 26 and 27. Spaced apart adjacent ones of these tips in turn define or establish restricted slot entrances along which winding turns may be moved into selected ones of the core slots as the stripper 28 of the illustrated apparatus moves axially along the longitudinally extending tools 18–20 and the other not shown tools of the apparatus.

It should be noted that a given piece of equipment or apparatus may be provided with tools in a substantially continuous circular array; or with groups of tools such as tools 11–13, that are spaced apart from other groups of tools. In addition, it is to be noted that while core teeth having enlarged tips have been shown, for purposes of discussion, the invention may be utilized where some or all of the core teeth have either very small tips or none at all. Cores of this type are shown, for example, in Lowell M. Mason U.S. Pat. 3,702,498, which issued Nov. 14, 1972.

Figure 3:
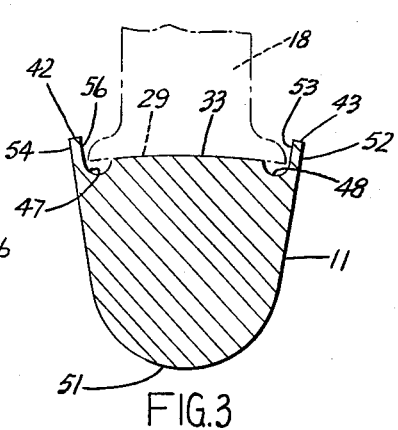
FIG. 3 is a sectional view taken along the line 3—3 in FIG. 2.

Close review of FIGS. 1 and 3 will reveal that the free extremities of the core teeth define spaced apart arcuately extending surfaces 29, 31, 32 of a circular bore that extends axially through the core 17.

The tools 11–13 are also provided with arcuate surfaces 33, 34, 35 that closely approximate the arcuate tooth surfaces at least along the portions of the tools that are adjacent to such tooth surfaces. Moreover, the illustrated tools each include a pair of lips that overlie the slot entrance defining portions of the teeth 18–20 so that, when winding material is forced by movable blades 36–39 of stripper 28 along and out of the gaps 41 between adjacent tools; the winding material will be protected from damage by the core laminations.

Figure 2:
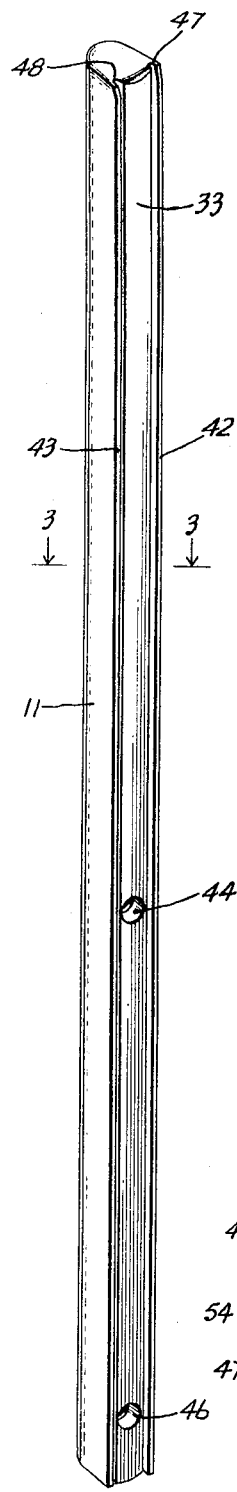
FIG. 2 is a perspective view of one of the tools shown in FIG. 1.

The overall appearance of the tool 11 will be best appreciated from FIGS. 2 and 3, and it will be noted that the tool includes lips 42, 43. Tool 11 also includes two mounting holes 44, 46 which may be used to mount it, for example with pins or screws to a tool support which may also be a wedge guide housing, if desired. Since tools 12 and 13 are substantially identical to tool 11, the remaining description, directed to only tool 11, would also apply to tools 12, 13.

Figure 4:
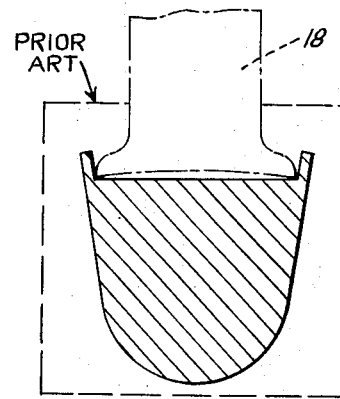
FIG. 4 is a sectional view of a prior art tool.

Now considering the structure of FIG. 3 with a prior art structure as represented by FIG. 4, it will be noted that, not only is a portion of surface 33 arcuate (rather than planar), but lips 42, 43 extend from longitudinally extending relieved regions 47, 48. Thus, while a tooth of a core such as core 17 is positioned adjacent to tool 11, contact between the bore surface of the tooth and the surface of tool 11 between lips 42, 43 will tend to exist or occur along the arcuate or non-planar surface 33.

In addition, contact between a core tooth and tool 11 generally will be avoided along the juncture of surface 33 and the base or root of lips 42, 43. In this way, stress concentrations that otherwise might occur at the base of lips 42, 43 are avoided and tools, such as tool 11, will not be damaged by breakage of the lips thereof nearly so readily as would be the case with the tool of FIG. 4 when a core tooth, such as tooth 18, engages such tool during a coil insertion or injection operation. It should now be understood that forces now are transmitted through the middle part of a tool or blade directly to a stator tooth instead of being concentrated at a weak lip area as has heretofore been the case.

It should be particularly noted that, while the tools in the drawing each have two lips; it is often desirable for a tool to have only one lip. For example, the last tool in a given array of tools may be positioned so that it defines a gap for receiving wire with only one other tool instead of with a tool on each side thereof. In this case, only the side of such last tool facing the wire receiving gap would be provided with a lip.

By way of complete description of one specific tool (like tool 11) that we have built, we made the tool, as viewed in FIG. 2, to have an overall longitudinal extent of about 9 and ¾ inches. This same tool was made to be used with a core having a nominal bore diameter of about 2 and ⅞ inches, and the surface corresponding to surface 33 corresponded to the arc of a circle having a radius that was at least slightly less than the bore radius of the core. For example, the surface 33 was on a radius of about 1.382 inches.

The overall dimension from the radially innermost portion of the tool when mounted (for example, point 51 on tool 11) to the radially outermost edge of the lips was about 0.330 inches, while the array of tools were spaced to define a wire opening or gap of about 0.053 inches, and the approximate distance between the bases of the lips between the points where surface 33 (if regions 47, 48 were not present) would intersect surfaces 53, 56 was about 0.278 inches. The radius of the regions 47, 48 was about 0.015 inches. The just described dimensions and relationships are, of course, exemplary, and different dimensions would of course be used for the actual designs of tools to be used for cores having different bore diameters, slot openings, and specifications concerning the windings to be inserted.

The radially innermost portions of the blades or tools may be bullet nose shaped as illustrated, flat, or tapered. In addition, the lip or lips of a particular tool may be tapered or may be made to have surfaces 52, 53 substantially parallel to one another, and the same is true of surfaces 54, 56. On the other hand, tool surfaces 52 and 54 may be disposed at different angles for different given tools. For example, when taking the center of the stator bore in FIG. 1 to also be the center of a tooling array; surface or side 52 of lip 43 and side 54 of lip 42 may each be parallel to a radial line drawn from the center of the tooling array. The included angle between the two radial lines may be 10° or about 15°, for example, depending on the arcuate extent of each core tooth. With an angle of about, respectively, 10 and 15°, between radial lines parallel to surfaces 52 and 54; these surfaces have been spaced parallel to and about 0.025 inches away (inside of) the radial lines.

As mentioned above, forces now can be transmitted to and from the body of a tool and center portion of a core tooth. This effect also can be accomplished even if grooves are provided in the face or surface 33, since forces would still in that case, be transmitted through regions of tools (such as tools 11–13) other than regions 47 and 48.

It will now be seen that the present invention provides new and improved apparatus and tools that accomplish the objects stated above. Moreover, while the invention has been described by referring one illustrated embodiment thereof, it will be apparent that modifications may be made without departing from the actual invention defined by the following claims.

What I claim as new and desire to secure by Letters Patent of the United States is:

1. Coil insertion apparatus including a plurality of longitudinally extending members with selected adjacent ones of the longitudinally extending members mutually establishing winding turn accommodating gaps; at least some of the longitudinally extending members being disposed in an array and establishing surfaces along a path that at least aproximately corresponds to the bore of a preselected type of laminated magnetic core having winding admitting passages formed therein for accommodating winding turns during movement from at least one of the turn accommodating gaps; at least one of said longitudinally extending members being formed so that a radially outer portion, relative to the array, defines at least one curved surface along an arc that at least approximately corresponds to the bore of a core so that forces may be transmitted between said at least one longitudinally extending member and a bore defining surface of a core through a central portion of the longitudinally extending member.

2. The structure of claim 1 wherein said at least one longitudinally extending member includes at least one lip extending outwardly for extension into a coil admitting entrance of a core.

3. The structure of claim 2 wherein said at least one lip extends from the body of said at least one longitudinally extending member and, in conjunction with the radially outer portion, defines a longitudinally extending relieved region.

4. A tool for use in coil insertion equipment, said tool comprising a longitudinally extending body portion having at least a portion of a longitudinally extending surface thereof formed to be non-planar and arcuate, said surface having a curvature corresponding at least approximately to the curvature of bore surfaces of a core into which windings are insertable during utilization of the tool; said tool further comprising at least one lip extending from said longitudinally extending body portion; said lip and said at least one part of said surface mutually defining an undercut region of the tool so that forces transmitted relative to said tool and a core may be transmitted through the body of the tool and so as to avoid stress concentrations at the juncture of the lip and the body of the tool.

5. The structure of claim 4 wherein at least two spaced apart longitudinally extending lips are provided.

6. A tool for use in the insertion of winding turns into a slot of a stator core, said tool comprising a body portion having a first portion particularly adapted to engage a bore defining surface of the core; said tool further comprising at least one lip for extension toward a slot in the core; said at least one lip joining the body of said tool along a longitudinally extending relieved region.

7. The structure of claim 6 wherein at least two lips are provided at spaced apart regions of said tool.

8. The structure of claim 7 wherein a longitudinally extending surface portion of the tool exists between said two lips, and said surface is curved with a curvature that at least approximately corresponds to the curvature of the bore defining surface of a tooth of a magnetic core.

9. An array of coil insertion tools disposed about a center of curvature, at least one of the tools in the array having a curved surface segment corresponding at least approximately to a curved surface defining portion of a laminated magnetic core having a bore center when the bore center at least approximately coincides with the center of curvature of the array; said at least one tool including at least one lip extending from the body of said tool radially outwardly from the center of curvature of the array.

10. The structure of claim 9 wherein said lip joins another portion of said at least one tool at an undercut region; said undercut region extending longitudinally along the tool at least for a distance associated with the axial height of a magnetic core.

* * * * *